United States Patent
Yee et al.

(10) Patent No.: US 10,604,117 B2
(45) Date of Patent: Mar. 31, 2020

(54) WINDSCREEN WIPER DEVICE

(71) Applicant: Federal-Mogul Motorparts LLC, Southfield, MI (US)

(72) Inventors: Jesus Yee, El Paso, TX (US); David Reyes, Chihuahua (MX)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 15/783,327

(22) Filed: Oct. 13, 2017

(65) Prior Publication Data
US 2018/0105142 A1 Apr. 19, 2018

Related U.S. Application Data

(60) Provisional application No. 62/408,162, filed on Oct. 14, 2016.

(51) Int. Cl.
*B60S 1/38* (2006.01)
*B60S 1/40* (2006.01)

(52) U.S. Cl.
CPC .......... *B60S 1/3851* (2013.01); *B60S 1/386* (2013.01); *B60S 1/3858* (2013.01);
(Continued)

(58) Field of Classification Search
CPC .... B60S 1/3849; B60S 1/3851; B60S 1/3858; B60S 1/3853; B60S 1/3879; B60S 1/386;
(Continued)

(56) References Cited

U.S. PATENT DOCUMENTS 2,581,103 A * 1/1952 Horton ............... B60S 1/4038
15/250.32
7,350,259 B2 * 4/2008 Walworth ........... B60S 1/3856
15/250.201
(Continued)

FOREIGN PATENT DOCUMENTS

DE 10038397 * 3/2002
DE 10038992 * 3/2002
(Continued)

OTHER PUBLICATIONS

Machine translation of description portion of German publication 10038397, published Mar. 2002. (Year: 2002).*
(Continued)

*Primary Examiner* — Gary K. Graham
(74) *Attorney, Agent, or Firm* — Miller Canfield

(57) ABSTRACT

The windscreen wiper device includes a longitudinally extending wiper element that is made of an elastomeric material. A carrier element, which includes at least one pre-curved longitudinal strip, operably supports the wiper element. The wiper device also includes a connector device with a first piece and with a second piece. A joint part is also provided, and the joint part is connectable with the second piece of the connector device and is configured for attachment with an oscillating wiper arm. The second piece includes a pair of prongs which extend through aligned openings in the first piece and the at least one longitudinal strip. Ends of the prongs are plastically deformed to lock the first and second pieces of the connector device with the at least one pre-curved longitudinal strip.

20 Claims, 10 Drawing Sheets

(52) U.S. Cl.
CPC ........... *B60S 1/4064* (2013.01); *B60S 1/3868* (2013.01); *B60S 1/4009* (2013.01)

(58) Field of Classification Search
CPC ........ B60S 1/3848; B60S 1/40; B60S 1/4064; B60S 1/3868; B60S 1/4009
USPC ............. 15/250.32, 250.43, 250.44, 250.361
See application file for complete search history.

(56) References Cited

U.S. PATENT DOCUMENTS

| | | | |
|---|---|---|---|
| 7,503,095 B2 | 3/2009 | Lin et al. | |
| 7,908,703 B2 | 3/2011 | Van Bealan | |
| 8,020,246 B2 | 9/2011 | Bauer et al. | |
| 8,037,568 B2* | 10/2011 | Lee | B60S 1/381 15/250.201 |
| 8,769,762 B2 | 7/2014 | Op't Roodt et al. | |
| 8,950,035 B2 | 2/2015 | Benner et al. | |
| 9,096,195 B2* | 8/2015 | Boland | B60S 1/381 |
| 2006/0026786 A1 | 2/2006 | Ku | |
| 2013/0117957 A1 | 5/2013 | Ku | |
| 2013/0305477 A1* | 11/2013 | Genet | B60S 1/381 15/250.201 |
| 2014/0082877 A1 | 3/2014 | Boudjenah et al. | |
| 2014/0082878 A1 | 3/2014 | Boland | |
| 2014/0289990 A1 | 10/2014 | Boulanger | |
| 2015/0197216 A1 | 7/2015 | Boland | |

FOREIGN PATENT DOCUMENTS

| | | |
|---|---|---|
| EP | 1564094 A1 | 8/2005 |
| FR | 2915445 A1 | 10/2008 |
| WO | 2013089350 A1 | 6/2013 |

OTHER PUBLICATIONS

International Search Report, dated Jan. 5, 2018 (PCT/US2017/056687).

* cited by examiner

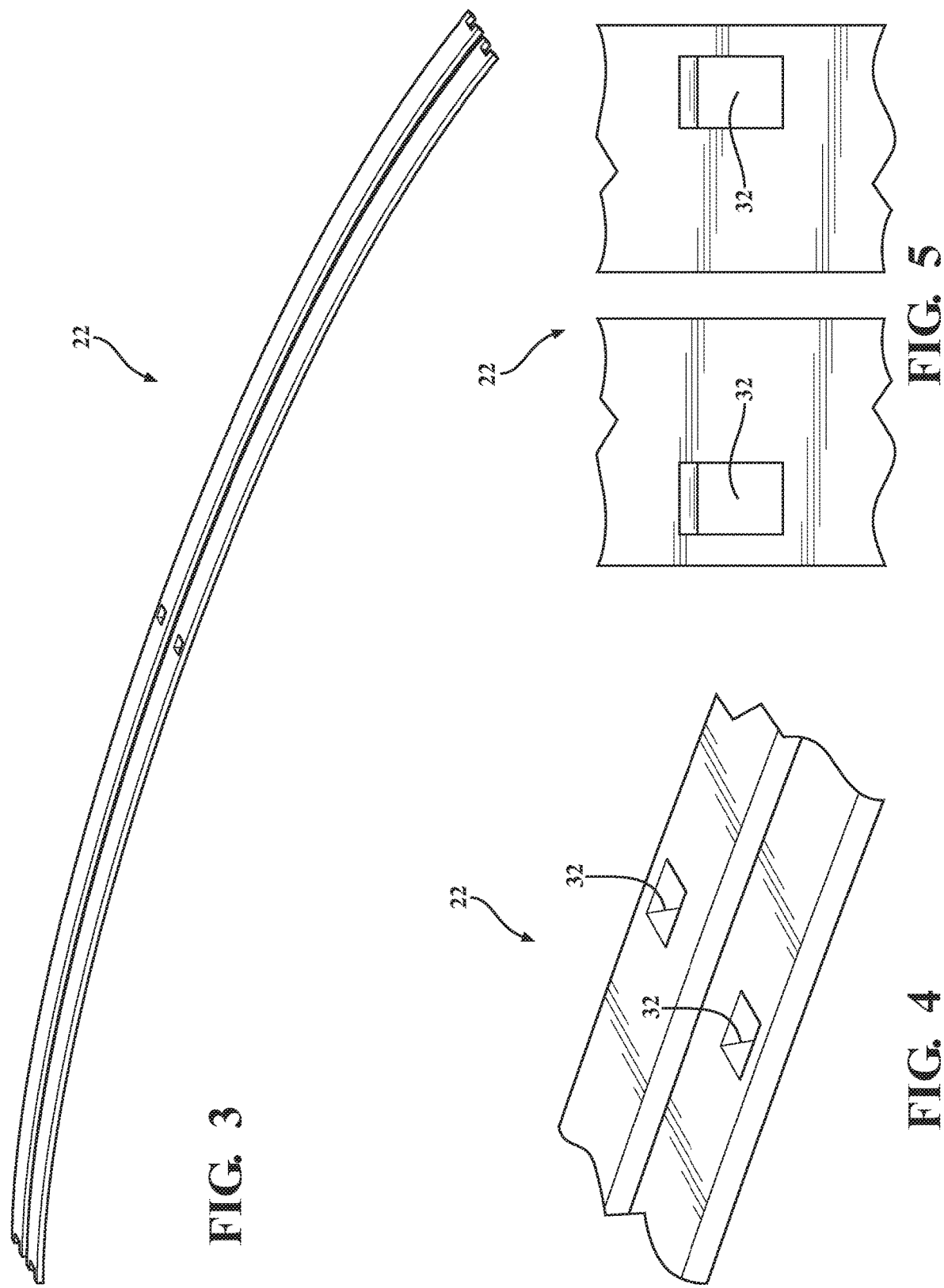

WINDSCREEN WIPER DEVICE

CROSS-REFERENCE TO RELATED APPLICATION

This application claims of the benefit of U.S. Provisional Patent Application Ser. No. 62/408,162, filed Oct. 14, 2016, entitled "Windscreen Wiper Device", the entire disclosure of the application being considered part of the disclosure of this application and hereby incorporated by reference.

BACKGROUND OF THE INVENTION

1. Field of the Invention

The present invention is related generally to windscreen wiper device and, more particularly, to the connector devices of windscreen wiper devices.

2. Related Art

Windscreen wiper devices typically fall into one of three basic categories: conventional, beam and hybrid. Conventional blades utilize a frame structure which consists of a system of yokes arranged in a tournament-style construction to distribute a biasing force from an oscillating wiper arm across a length of an elastomeric wiper blade. Beam blades utilize a carrier element, which typically includes one or more longitudinal strips of spring steel, to distribute the biasing force along the length of the wiper strip. Hybrid blades typically include both a frame structure and a carrier element to distribute the biasing force from the wiper arm.

In beam blades, a connecting device is attached directly to the carrier element. In some cases, the connecting device is glued/bonded with the carrier element, and in others, the connecting device is ultrasonically welded with the carrier element. However, the gluing, bonding and/or welding operations take time and add to the cost of making the windscreen wiper device.

SUMMARY OF THE INVENTION AND ADVANTAGES

One aspect of the present invention is related to a windscreen wiper device with a longitudinally extending wiper element that is made of an elastomeric material. A carrier element, which includes at least one pre-curved longitudinal strip, operably supports the wiper element. The wiper device also includes a connector device with a first piece and with a second piece. A joint part is also provided, and the joint part is connectable with the second piece of the connector device and is configured for attachment with an oscillating wiper arm. The second piece includes a pair of prongs which extend through aligned openings in the first piece and the at least one longitudinal strip. Ends of the prongs are plastically deformed to lock the first and second pieces of the connector device with the at least one pre-curved longitudinal strip.

The connector device relies on only mechanical junctions to connect the first and second pieces of the connector device with the at least one pre-curved longitudinal strip. No welding, adhesives, brazing or other such processes, which would increase the manufacturing cost of the wiper device, are required. Additionally, the connector device offers improved resistance to breakage and torque resistance as compared to other known connector devices.

According to another aspect of the present invention, the first piece of the connector device is made of plastic, and the second piece of the connector device is made of metal.

According to yet another aspect of the present invention, the ends of the prongs are plastically deformed in laterally outward directions.

According to still another aspect of the present invention, the ends of the prongs are plastically deformed in laterally inward directions.

According to a further aspect of the present invention, the second piece of the connector device has a pair of co-axially aligned protrusions that are received in co-axially aligned openings in the joint part to allow the joint part to pivot relative to the connector device.

According to yet a further aspect of the present invention, the second piece of the connector device includes a pair of generally J-shaped side walls that are spaced apart from one another in a lateral direction.

According to still a further aspect of the present invention, each of the J-shaped side walls has a lower edge that is received in a respective slot on the first piece of the connector device.

Another aspect of the present invention is related to a method of making a windscreen wiper device. The method includes the step of operably supporting a wiper element, which is made of an elastomeric material, with at least one pre-curved longitudinal strip. The method continues with the step of aligning at least two openings in a first piece of a connector device with at least two openings in the at least one pre-curved longitudinal strip. The method proceeds with the step of inserting prongs of a second piece of the connector device through the aligned openings of the first piece and the at least one pre-curved longitudinal strip. The method continues with the step of plastically deforming ends of the prongs of the connector device with the at least one pre-curved longitudinal strip.

According to another aspect of the present invention, the first piece of the connector device is made of plastic, and the second piece of the connector device is made of metal.

According to yet another aspect of the present invention, the step of plastically deforming the ends of the prongs is further defined as bending the ends of the prongs in laterally outward directions.

According to still another aspect of the present invention, the step of plastically deforming the ends of the prongs is further defined as bending the prongs in laterally inward directions.

According to a further aspect of the present invention, the method further includes the step of operably attaching a joint part with the second piece of the connector device.

According to yet a further aspect of the present invention, the second piece of the connector device has a pair of laterally spaced apart side walls.

According to still a further aspect of the present invention, the side walls of the second piece of the connector device are generally J-shaped.

According to another aspect of the present invention, the method further includes the step of receiving lower edges of the generally J-shaped side walls into slots on the first piece of the connector device.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

FIG. 3 is a perspective view of a pair of longitudinal strips of the first exemplary embodiment of the windscreen wiper device;

FIG. 4 is an enlarged and fragmentary view of portions of the longitudinal strips of FIG. 3;

FIG. 5 is top elevation and fragmentary view of portions of the longitudinal strips of FIG. 3;

DESCRIPTION OF THE ENABLING EMBODIMENT

Figure 1:
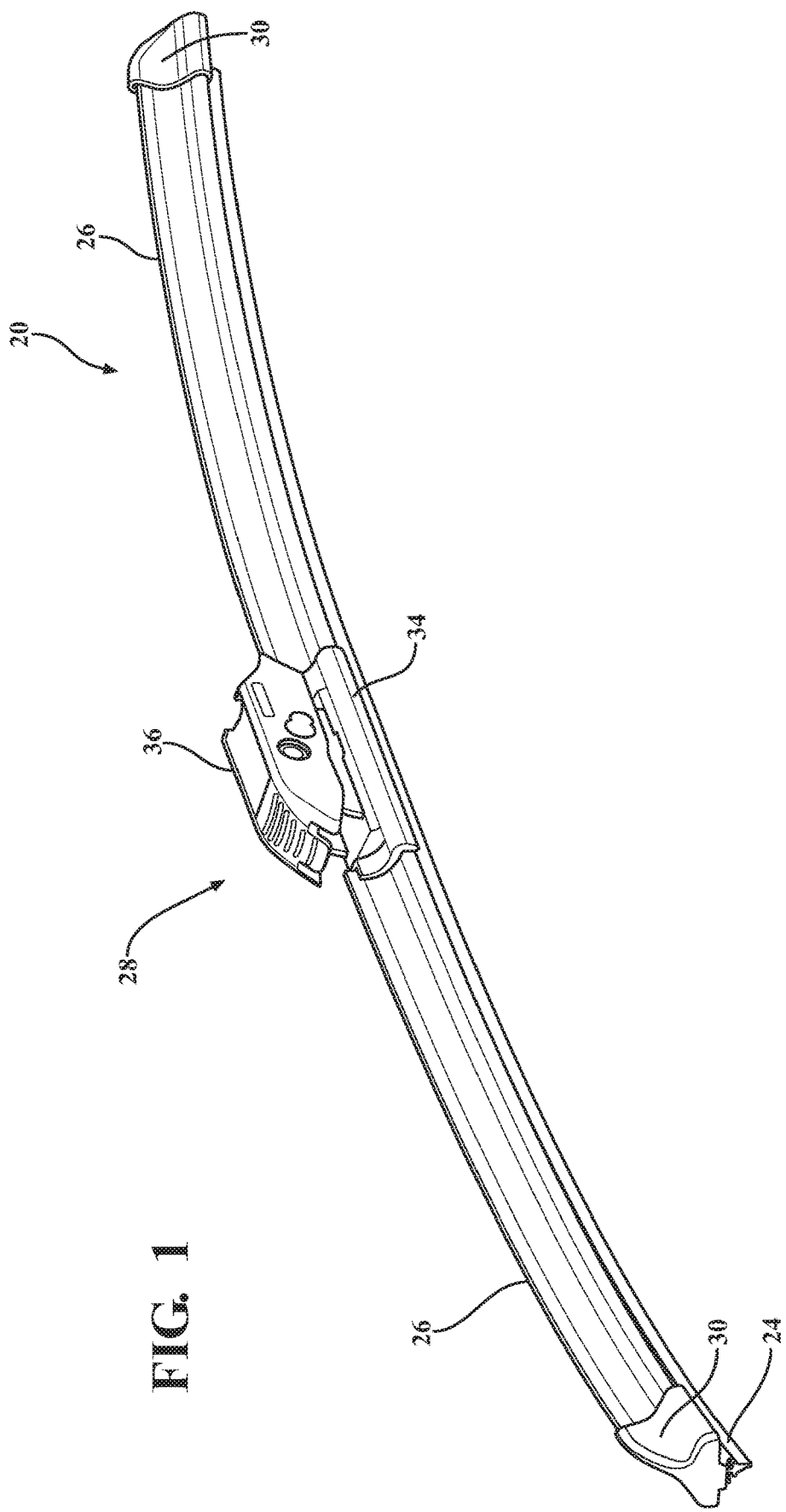
FIG. 1 is a perspective view of a windscreen wiper device constructed according to a first exemplary embodiment of the present invention.
Figure 2:
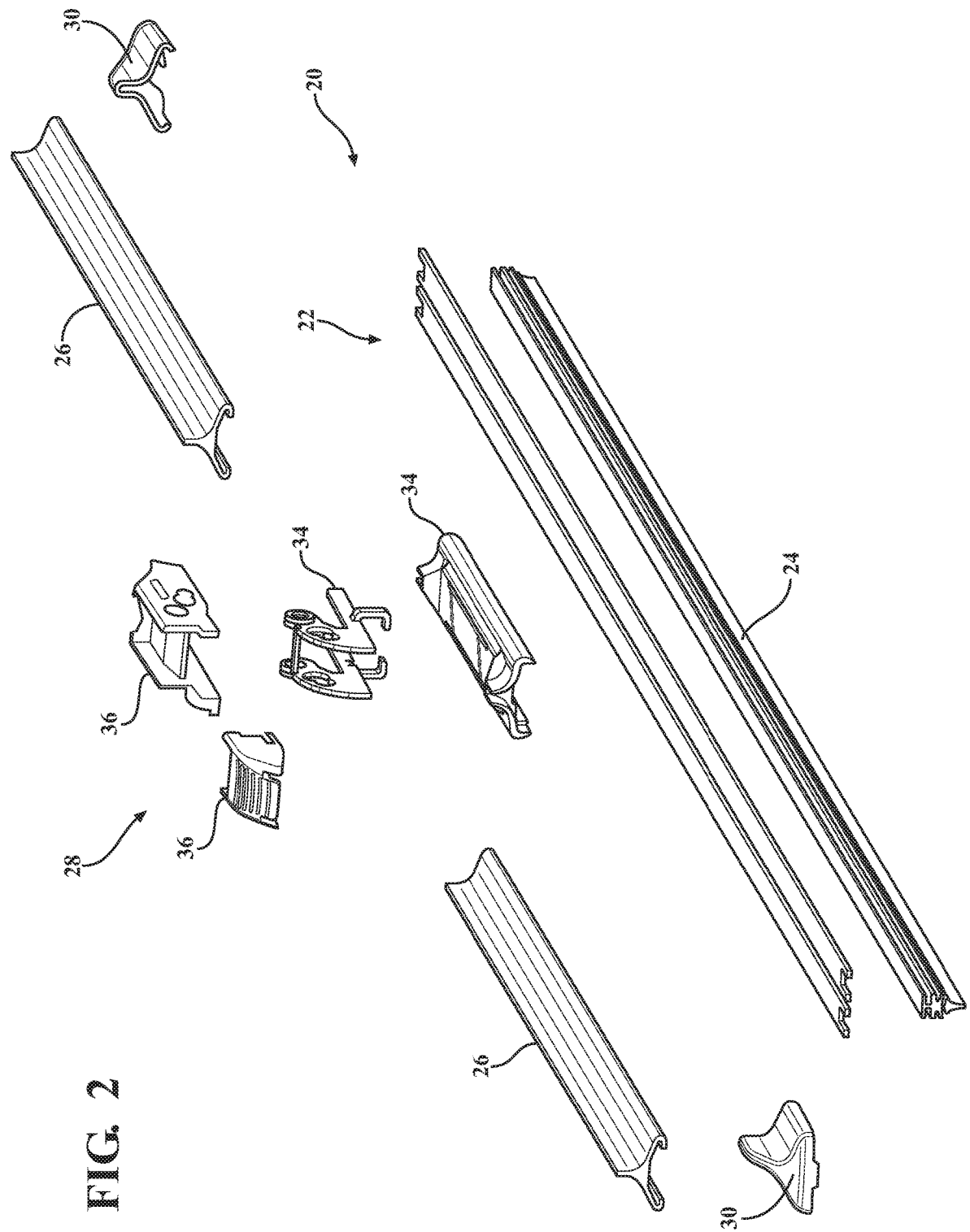
FIG. 2 is an exploded view of the first exemplary embodiment of the windscreen wiper device.

Referring to the Figures, wherein like numerals indicate corresponding parts throughout the several views, a first exemplary embodiment of a windscreen wiper device 20 is generally shown in FIGS. 1 and 2. The windscreen wiper device 20 has a beam-style construction in that it includes a longitudinally extending carrier element 22 which is pre-shaped to bias a wiper element 24 (also known as a wiper blade or a wiper strip) made of an elastomeric material, such as rubber, into a curved shape, thereby allowing an entire length of the wiper element 24 to seal against a curved windshield (not shown) of a vehicle. That is, in the exemplary windscreen wiper device 20, the carrier element 22, not a series of yokes, distributes a force from an oscillating wiper arm (not shown) across the length of the wiper element 24. The exemplary windscreen wiper device 20 also includes a pair of sub-spoilers 26, which are made as separate pieces from one another and are attached with the carrier element 22, for imparting a downforce on the wiper element 24 when the vehicle is travelling at speed to improve the fluid-tight seal between the wiper element 24 and the windshield. A connecting assembly 28 is engaged with the carrier element 22 at approximately a longitudinal midpoint of the carrier element 22 for lockingly connecting the windscreen wiper device 20 with an oscillating wiper arm (not shown). A pair of end caps 30 are engaged with opposite ends of the carrier element 22 for retaining the sub-spoilers on the carrier element 22 between the connecting assembly 28 and the end caps 30. In the exemplary embodiment, the carrier element 22 includes a pair of longitudinal strips 22 that are made of spring steel and that are received in longitudinally extending grooves of the wiper element 24. However, it should be appreciated that the carrier element 22 could take other forms, e.g., the carrier element could be a single longitudinal strip that is glued to the wiper element or it could be a single longitudinal strip that is received within a single longitudinal groove of a one-piece wiper element and spoiler.

Referring now to FIGS. 3-5, in the first exemplary embodiment, each of the longitudinal strips 22 of the carrier element 22 includes only a single opening 32 which is spaced between opposite lateral edges of the respective longitudinal strip 22. That is, in this embodiment, each of the openings 32 has an outer periphery which is entirely within the outer confines of the respective longitudinal strip 22. In the longitudinal direction, the openings 32 are located approximately halfway between longitudinal ends of the longitudinal strips 22. The openings 32 are generally rectangular in shape.

The connecting assembly 28 includes a two-piece connector device 34 and an adapter, or joint part 36, which is pivotably attached with the connector device 34. The joint part 36 may be configured for attaching the wiper device 20 with any suitable type of oscillating wiper arm (not shown) including, for example, hook-style, bayonet-style, side pin-style, etc. The pivoting connection between the joint part 36 and the connector device 34 allows the windscreen wiper device 20 and the oscillating wiper arm to pivot relative to one another, thus enabling easier attachment of the joint part 36 with and detachment of the joint part 36 from the oscillating wiper arm. The joint part 36 may take a range of different shapes for connecting the windscreen wiper device 20 with a range of differently shaped oscillating wiper arms, such as bayonet-style wiper arms, hook-style wiper arms, top lock-style wiper arms, side pin-style wiper arms, etc.

Figure 12:
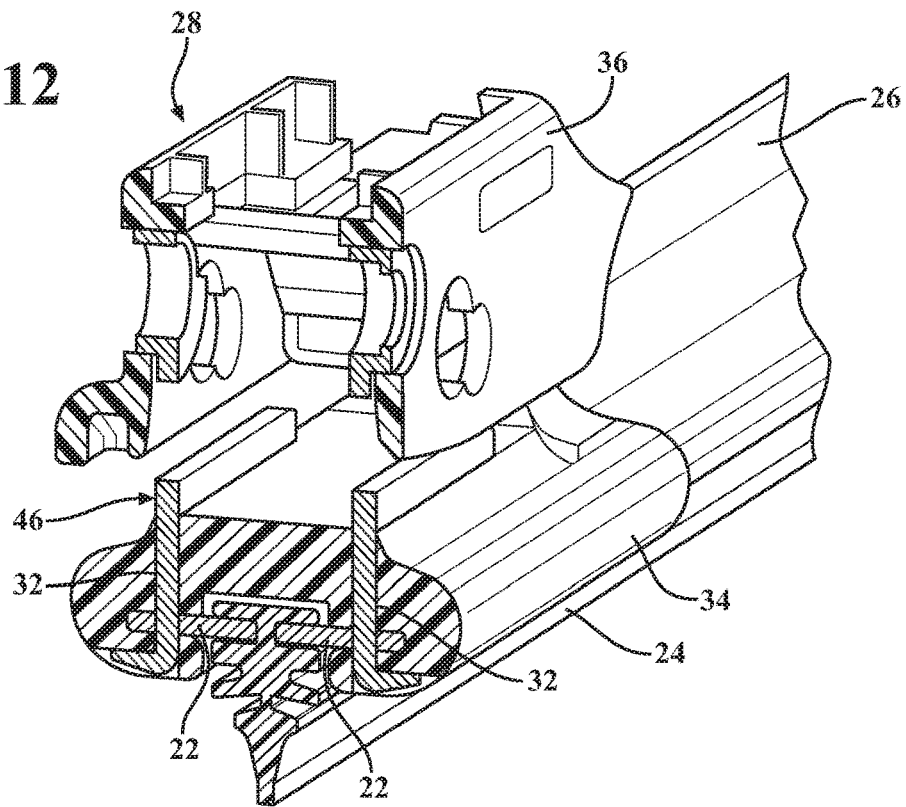
FIG. 12 is a sectional, fragmentary and perspective view of the first exemplary embodiment of the windscreen wiper device.

The connector device 34 includes a first piece (hereinafter referred to as a "base piece 38", which is shown in Figures in 6-8. The base piece 38 of the exemplary embodiment is made as a single, monolithic piece of injection molded plastic and includes U-shaped arms 40 which partially define a channel that is shaped to receive the longitudinal strips 22 of the carrier element. As shown in FIG. 12, the arms 40 of the base piece 38 wrap around oppositely facing lateral edges of the longitudinal strips 22 to retain the base piece 38 on the longitudinal strips 22. The base piece 38 also is generally symmetrical about a longitudinally and vertically extending plane such that it can be installed onto the longitudinal strips 22 of the carrier element in either direction.

Figure 6:
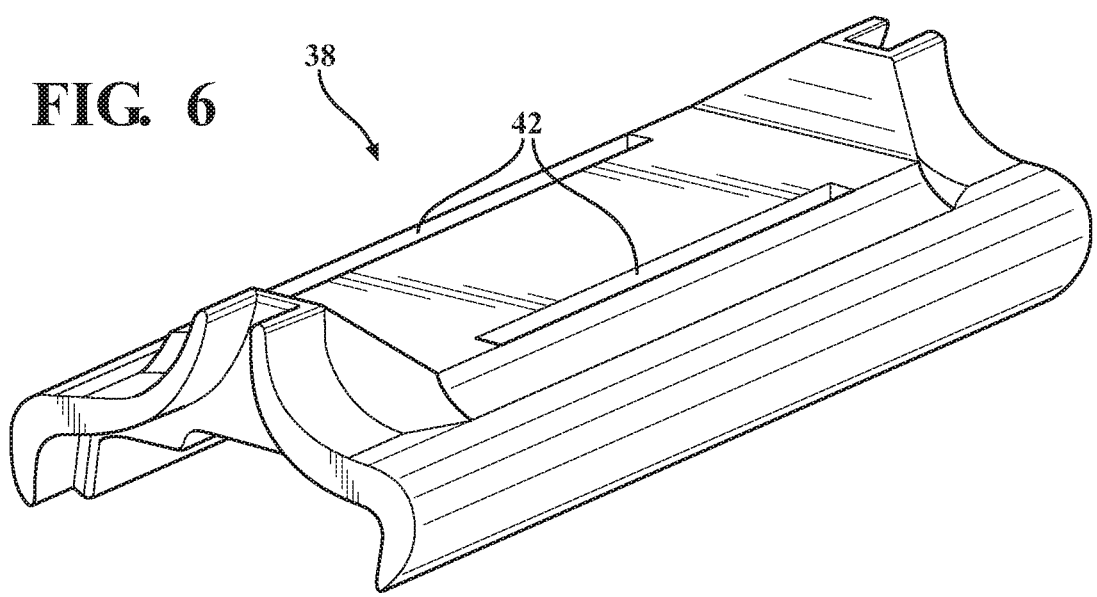
FIG. 6 is a perspective view of a first piece of a connector device of the first exemplary embodiment of the windscreen wiper device.
Figure 7:
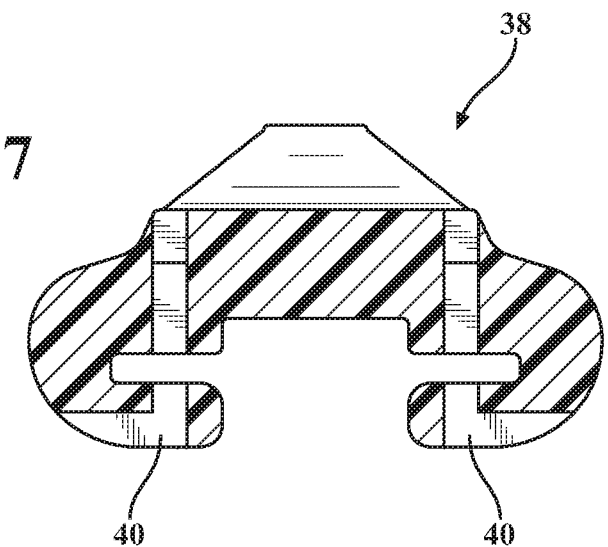
FIG. 7 is a front elevation view of the first piece of FIG. 6.
Figure 8:
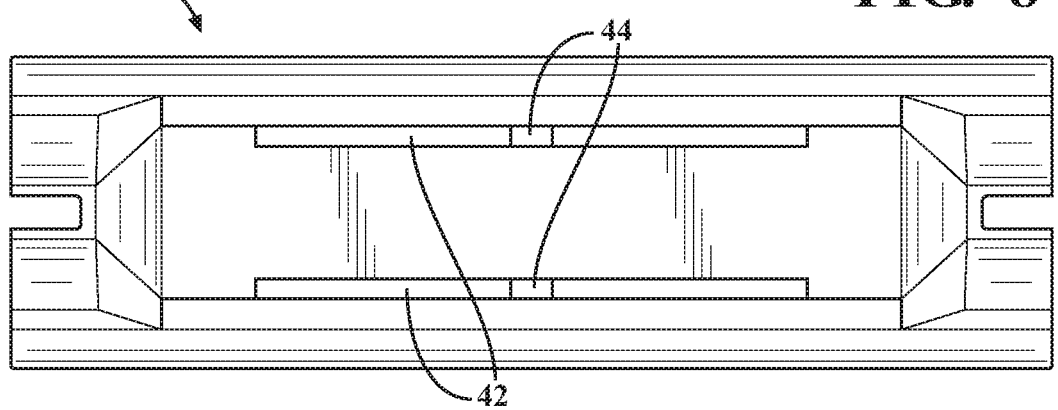
FIG. 8 is a top elevation view of the first piece of FIG. 6.
Figure 13:
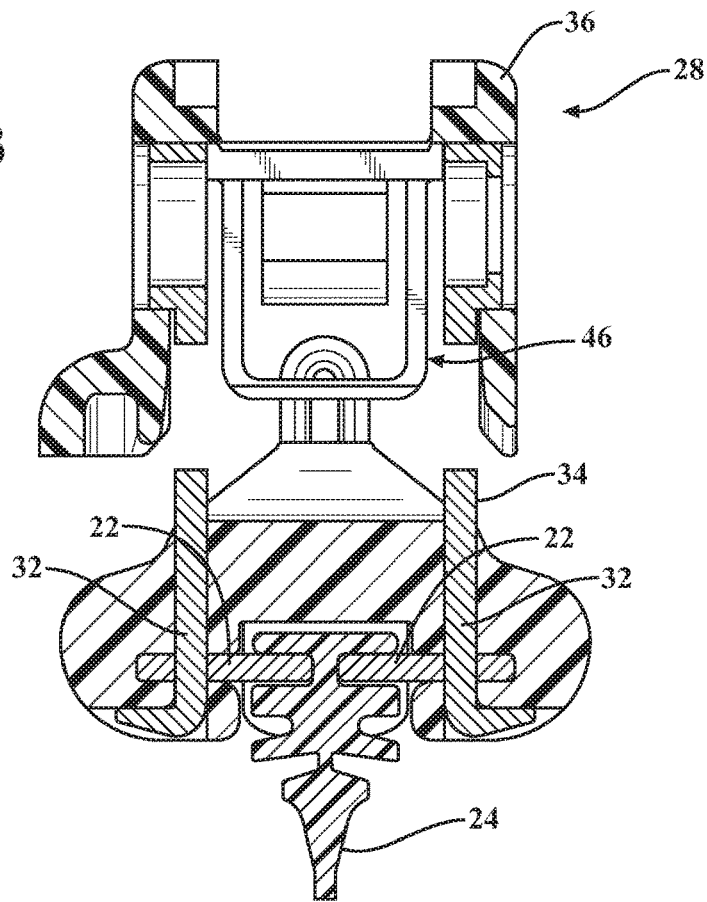
FIG. 13 is a cross-sectional view of the first exemplary embodiment of the windscreen wiper device.
Figure 14:
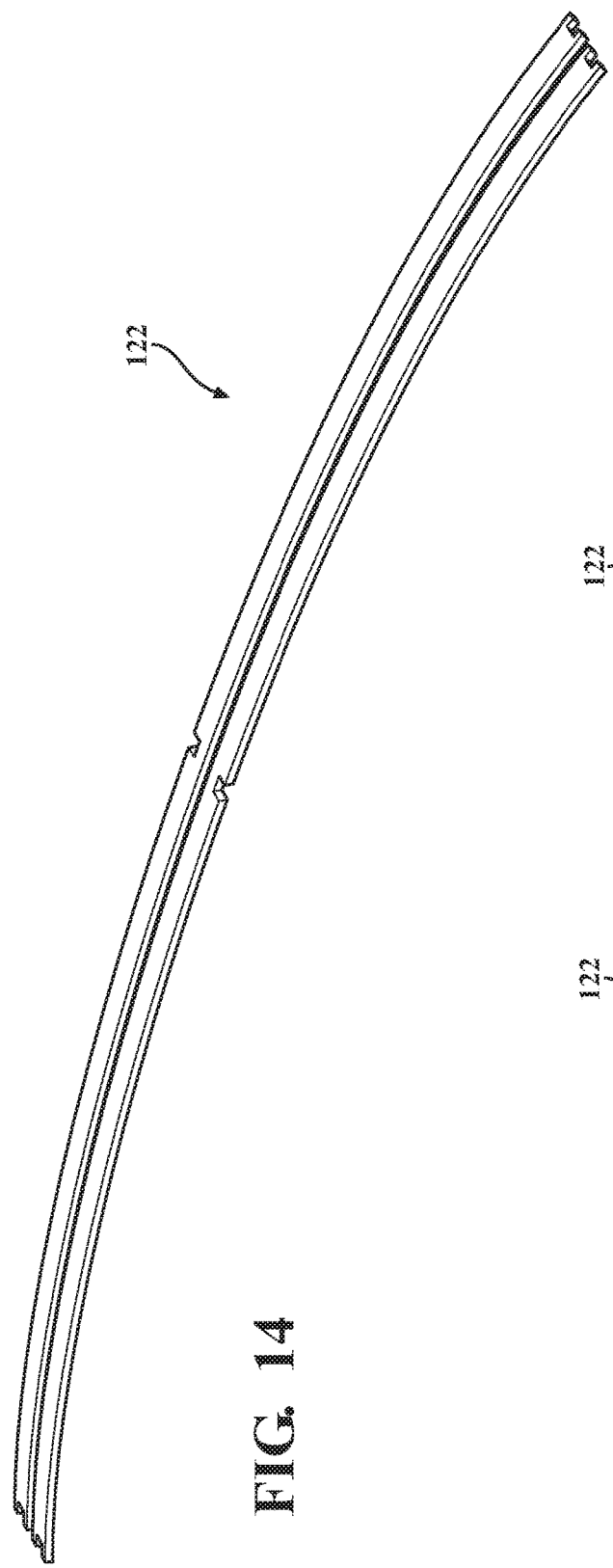
FIG. 14 is a perspective view of a pair of longitudinal strips of a second exemplary embodiment of the windscreen wiper device.
Figure 16:
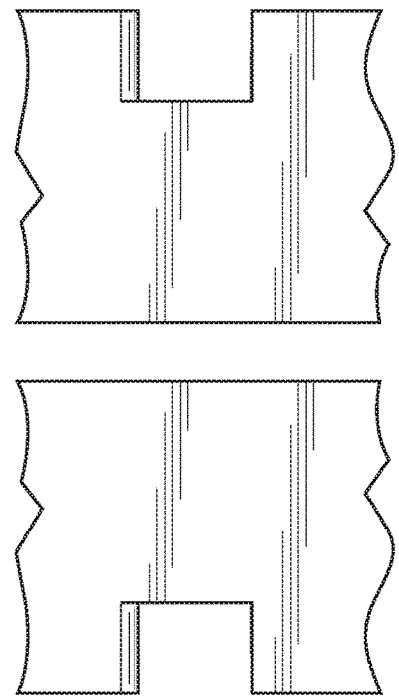
FIG. 16 is top elevation and fragmentary view of portions of the longitudinal strips of FIG. 14.
Figure 15:
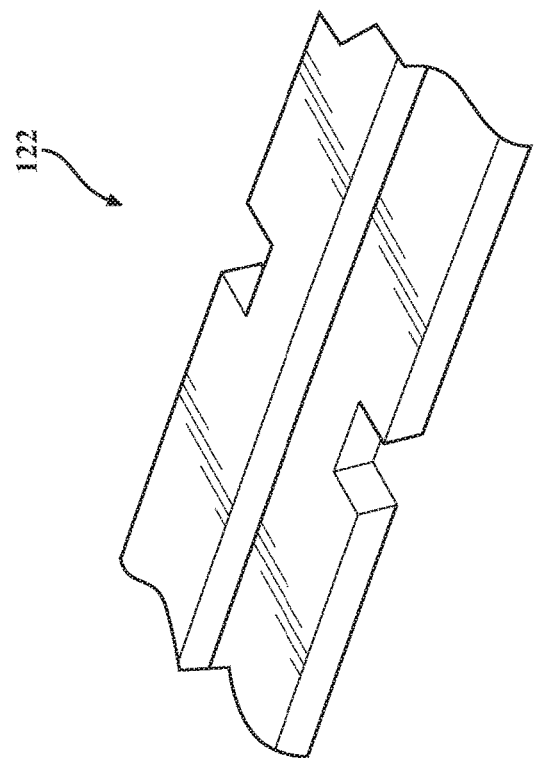
FIG. 15 is an enlarged and fragmentary view of portions of the longitudinal strips of FIG. 14.
Figure 17:
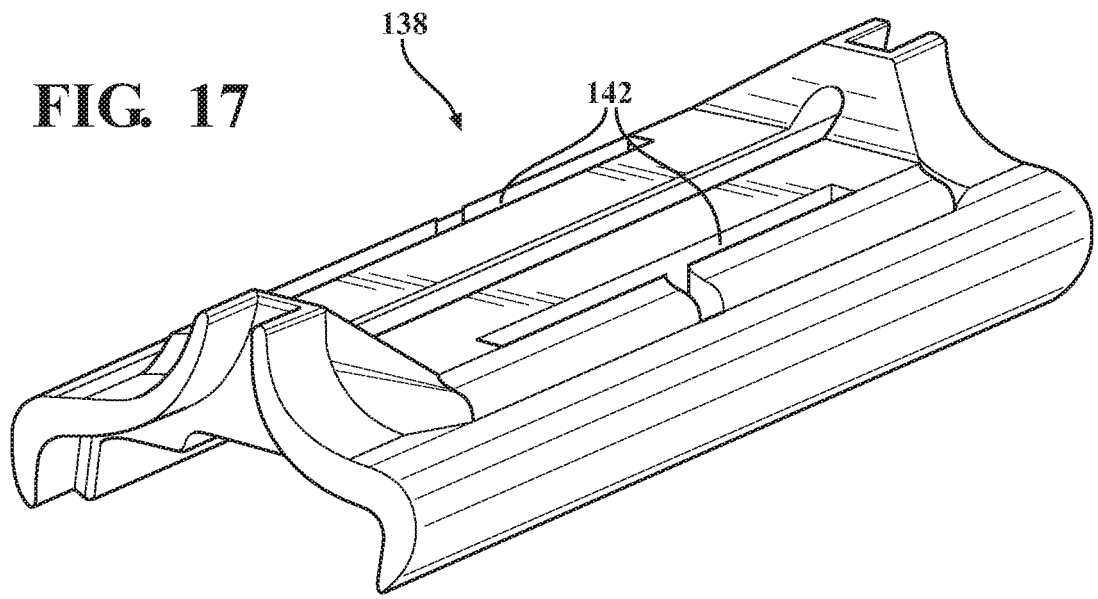
FIG. 17 is a perspective view of a first piece of a connector device of the second exemplary embodiment of the windscreen wiper device.
Figure 18:
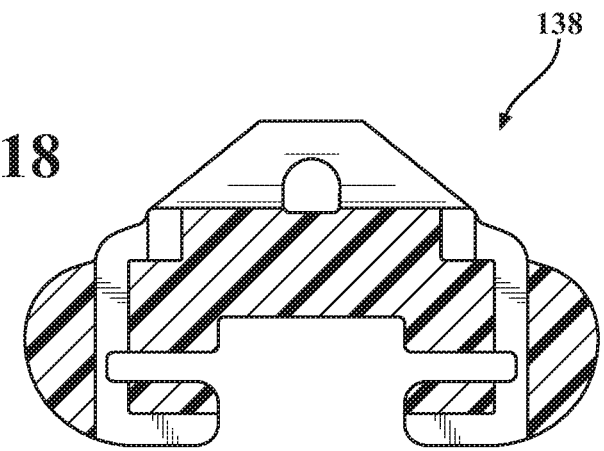
FIG. 18 is a front elevation view of the first piece of FIG. 17.
Figure 19:
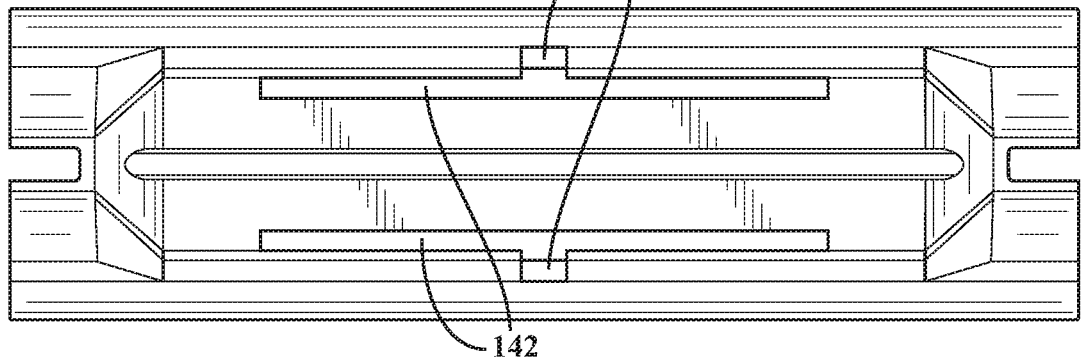
FIG. 19 is a top elevation view of the first piece of FIG. 17.
Figure 20:
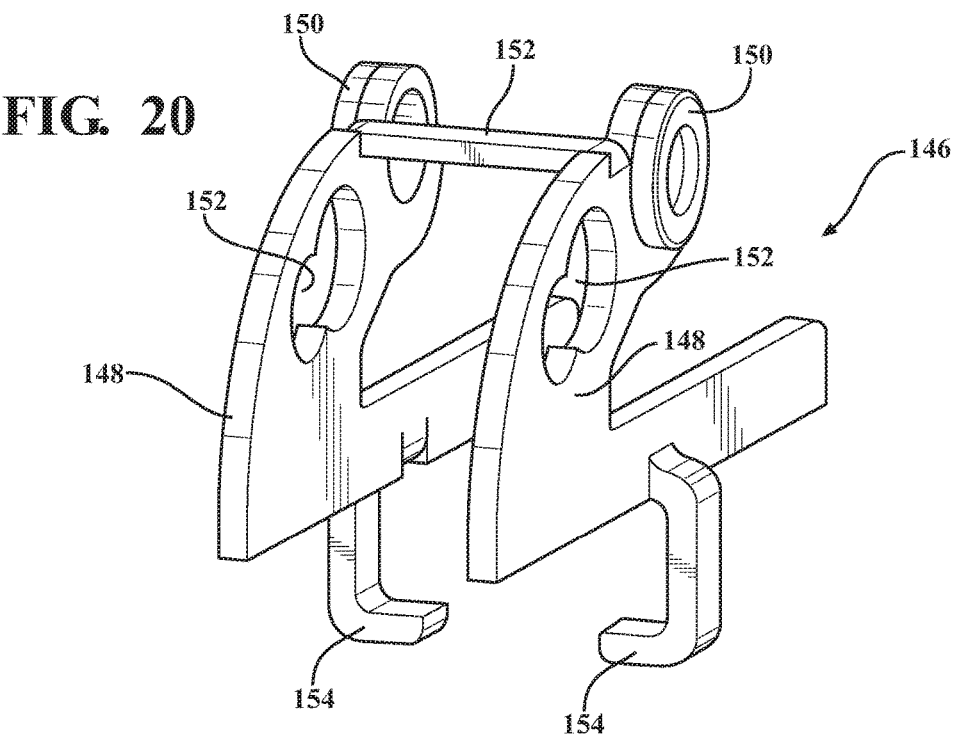
FIG. 20 is a perspective view of a second piece of a connector device of the second exemplary embodiment of the windscreen wiper device.
Figures 21, 22:
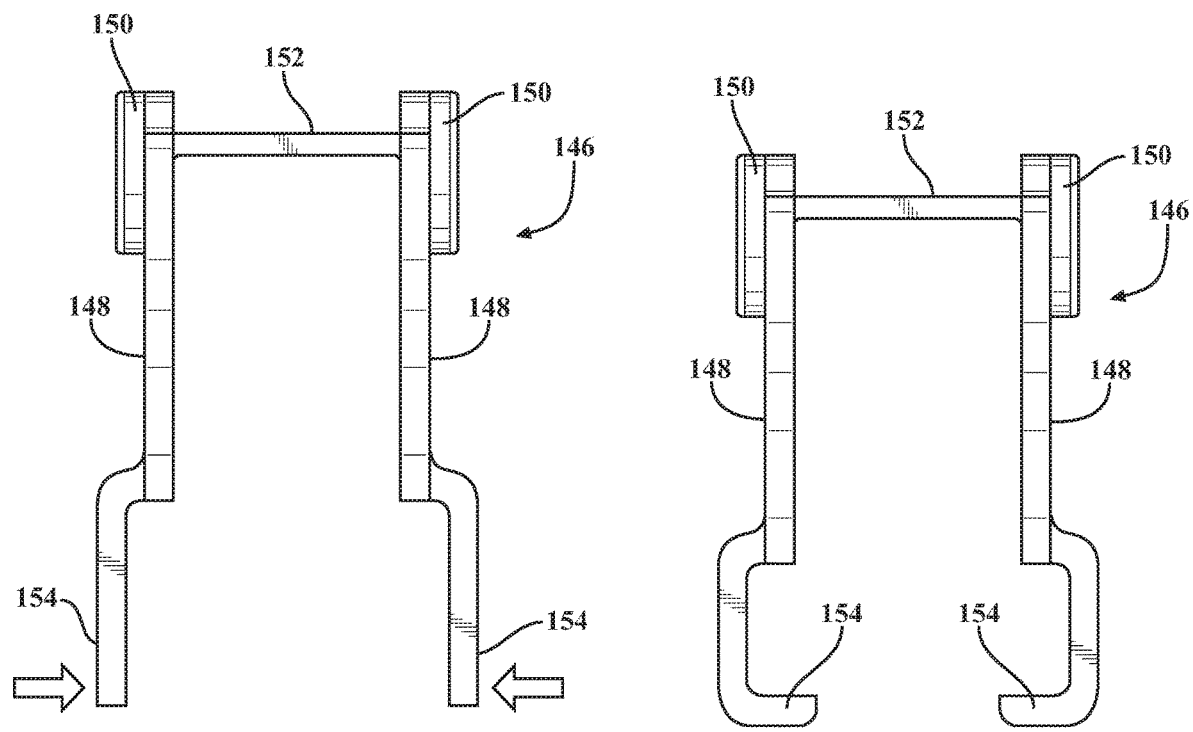
FIG. 21 is a front elevation view of the second piece of FIG. 20.
FIG. 22 is a front elevation view of the second piece of FIG. 20 after a bending operation.
Figure 23:
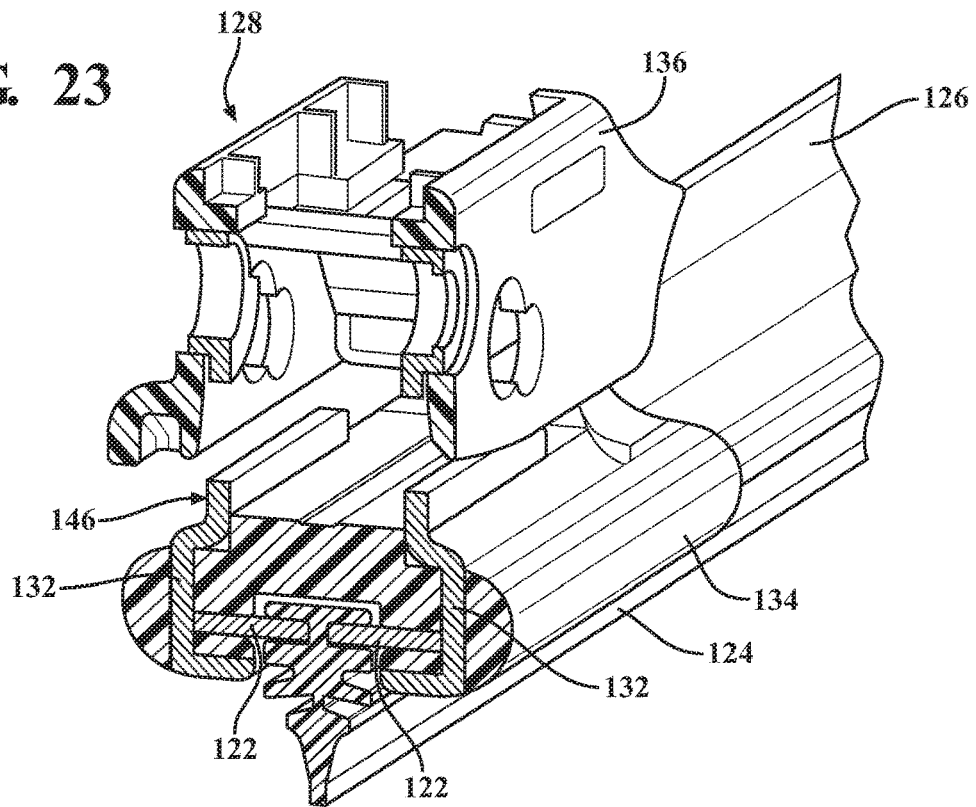
FIG. 23 is a sectional, fragmentary and perspective view of the second exemplary embodiment of the windscreen wiper device.
Figure 24:
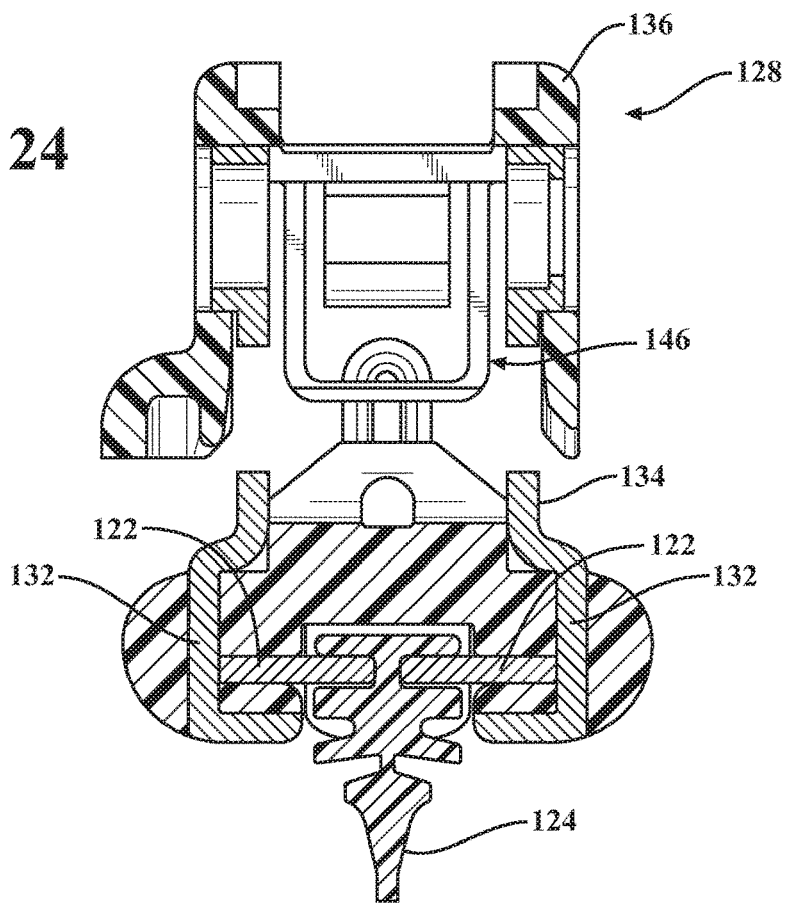
FIG. 24 is a cross-sectional view of the second exemplary embodiment of the windscreen wiper device.

Referring now to FIGS. 1 and 6, the base piece 38 has longitudinal end portions that are shaped to receive the longitudinal ends of the sub-spoilers 26 such that, when the windscreen wiper device 20 is assembled, longitudinal ends of the sub-spoilers 26 overlap partially with the longitudinal end portions of the base piece 38. Referring now to FIG. 8, the base piece 38 also has a top surface which is generally planar and which presents a pair of longitudinally extending slots 42, or grooves. The slots 42 are spaced from one another in a lateral direction on opposite sides of a longitudinally extending mid-plane of the base piece 38. Each of the slots 42 has an opening 44 which extends through a top wall of the base piece 38 to the channel. As shown in FIG. 13, the openings 44 of the base piece 38 are aligned with the openings 32 of the longitudinal strips 22 in the longitudinal direction.

Figure 9:
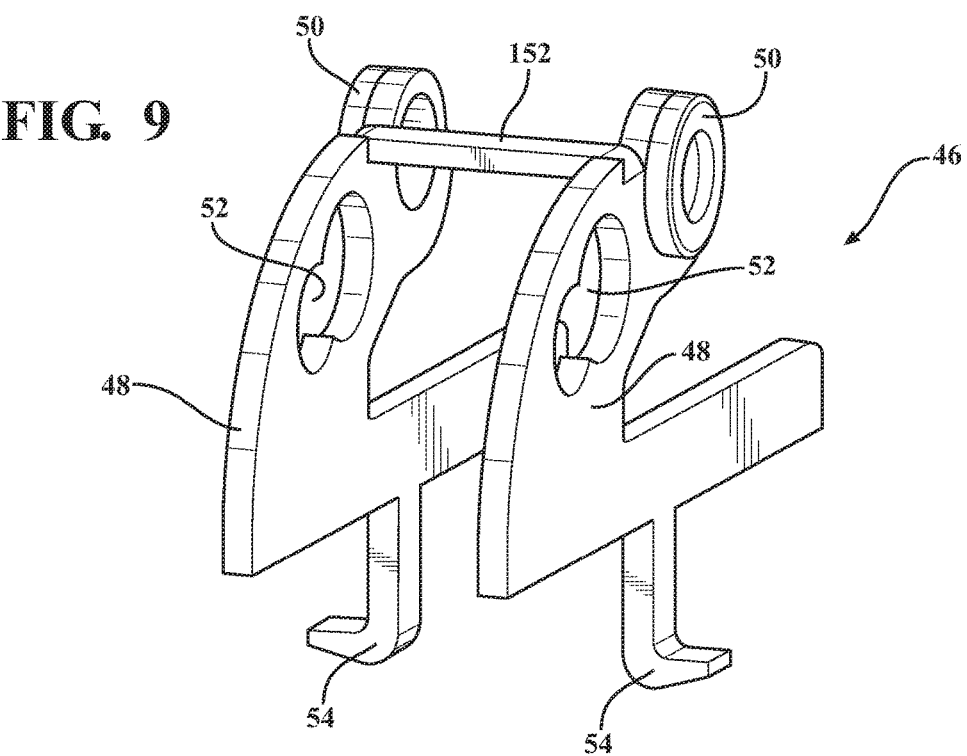
FIG. 9 is a perspective view of a second piece of a connector device of the first exemplary embodiment of the windscreen wiper device.
Figure 10:
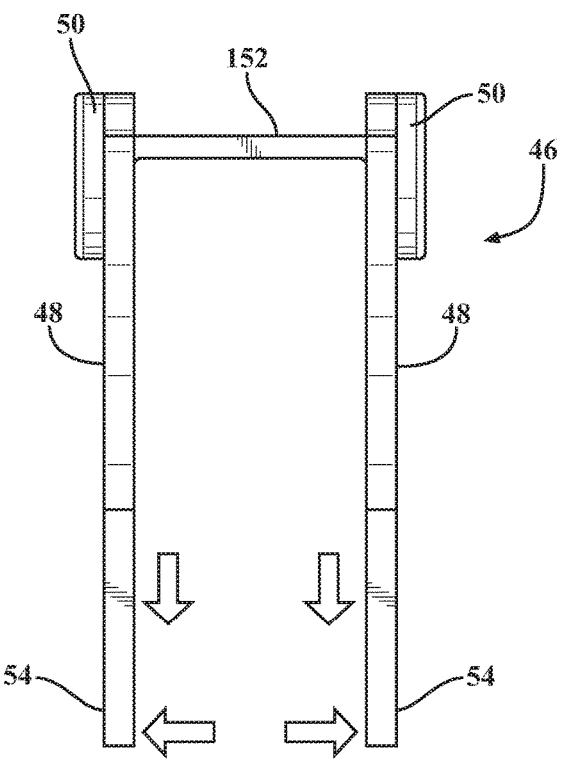
FIG. 10 is a front elevation view of the second piece of FIG. 9.
Figure 11:
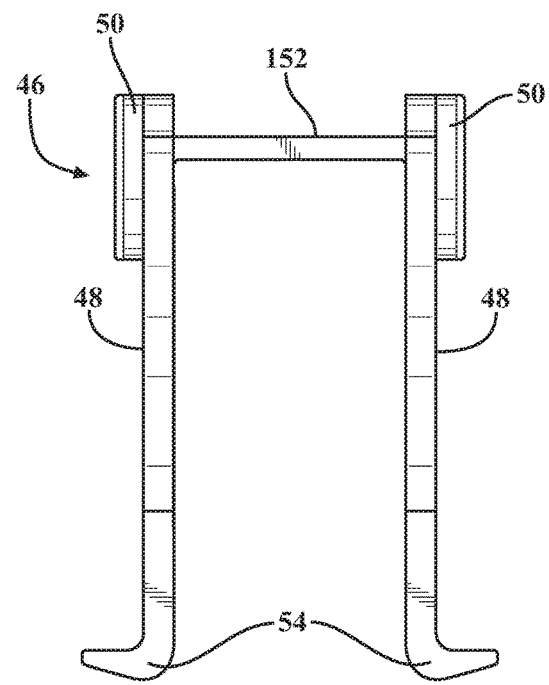
FIG. 11 is a front elevation view of the second piece of FIG. 9 after a bending operation.

The connector device 34 also includes a second piece (hereinafter referred to as a "spacer piece 46"), which is shown in FIGS. 9-11. The spacer piece 46 includes a pair of side walls 48 which are spaced part from one another in a lateral direction and which are each generally J-shaped with long legs and short legs. The long legs of the side walls 48 have lower edges that are configured to be received within the longitudinally extending slots 42 of the base 38. The side walls 48 also present a pair of protrusions 50 which protrude in opposite lateral directions and are co-axially aligned with one another. The protrusions 50 are circular in shape for receiving openings in the various joint parts 36 to connect a respective one of the joint parts 36 with the connector device 34 and to allow the respective joint part 36 to pivot relative to the spacer piece 46 about a pivot axis. The protrusions 50 are located at the ends of the short legs of the J-shaped side walls 48 such that they sit directly above gaps between the short legs and the long legs. The side walls 48 also include co-axial pin openings 52 that are spaced from the protrusions 50 for receiving pins of side pin-style wiper arms (not shown). Each pin opening 52 is positioned on a portion of the respective side wall 48 that interconnects the long leg of the J-shape with the short leg of the J-shape. The side walls 48 are interconnected with one another via a beam 52 which is located adjacent the protrusions 50.

The spacer piece 46 also presents a pair of projections, or prongs 54, which project vertically downwardly from the lower edges of the side walls 48. The projections 54 are rectangular in cross-sectional shape, similar to the openings 32, and extend through the aligned openings 44 in the base piece 38 and the openings 32 in the longitudinal strips 22. Ends of the prongs 54 are plastically deformed through bending to engage lower surfaces of the arms 40 of the base piece 38, thereby permanently locking the spacer piece 46 and the base piece 38 with the longitudinal strips 22. As shown in FIGS. 11 and 13, in the first exemplary embodiment, the prongs 54 are bent laterally outwardly, or away from one another so as to not damage the wiper element 24. As also shown in FIG. 13, the prongs 54 are aligned longitudinally with the protrusions 50, i.e., the prongs 54 are directly below the protrusions 50, and the bent ends of the prongs 54 are received in grooves in a lower surface of the base piece 38.

The spacer piece 46 is preferably made of a single piece of metal, such as steel or aluminum or alloys thereof, and may be shaped through any suitable process or combination of processes. In the exemplary embodiment, like the base piece 38 discussed above, the spacer piece 46 is generally symmetrical about a longitudinally and vertically extending plane.

Referring now to FIGS. 14-24, a second exemplary embodiment of the connector device 134 is generally shown with like numerals, separated by a prefix of "1" indicating corresponding parts with the first exemplary embodiment described above. In contrast to the first embodiment discussed above, in the second embodiment, the openings 132 of the longitudinal strips 122 are notches that open to the lateral edges of the longitudinal strips 132. As such, the lateral spacing between the openings 132 is greater in the second embodiment than it is in the first embodiment. To accommodate the increased spacing between the openings 132, the prongs 154 on the spacer piece 146 extend laterally outwardly from outer sides of the side walls 148 and then vertically downwardly rather than directly vertically downwardly. Also, in the second embodiment, the ends of the prongs 154 are bent laterally inwardly rather than outwardly and are received in laterally inwardly extending grooves on the bottom of the base piece 138. After bending, the ends of the prongs 154 are spaced laterally from the wiper element 124 to allow the wiper element to articulate about a hinge as the oscillating wiper arm changes direction during use.

In each of the first and second embodiments, the connector device 34, 134 relies on only mechanical junctions to connect the metal spacer 54, 154 and the plastic base 38, 138 with the longitudinal strips 22, 122. No welding, adhesives, brazing or other such processes, which would increase the manufacturing cost of the wiper device 20, 120, are required. Additionally, the connector devices 34, 134 offer improved resistance to breakage and torque resistance.

In each of the exemplary embodiments, the spacer piece 46, 146 has only two prongs 54, 154, each of which extends through an opening 32, 132 in a respective one of the longitudinal strips 22, 122. However, it should be appreciated that the spacer may include more than two prongs to further connect the base and spacer pieces 38, 46, 138, 148 with the longitudinal strips 22, 122.

Another aspect of the present invention is related to a method of making a windscreen wiper device 20, 120 such as either of the embodiments discussed above. The method includes the step of operably supporting the wiper element 24, 124 with the pre-curved longitudinal strips 22, 122. The method proceeds with the step of aligning the openings 44, 144 in the base piece 38, 138 of the connector device 34, 134 with the openings 32, 132 in the longitudinal strips 22, 122. The method continues with the step of inserting the prongs 54, 154 through the aligned openings 32, 44, 132, 144. The method proceeds with the step of receiving lower edges of the generally J-shaped side walls 48, 148 of the spacer piece 46, 146 into the slots 42, 142 of the base piece 38, 138. The method continues with the step of plastically deforming, such as through bending, the ends of the prongs 54, 154 to lockingly connect the base and spacer pieces 38, 46, 138, 146 with the longitudinal strips 22, 122. The method proceeds with the step of attaching the joint part 36, 136 with the spacer piece 46, 146.

Obviously, many modifications and variations of the present invention are possible in light of the above teachings and may be practiced otherwise than as specifically described while within the scope of the appended claims.

What is claimed is:
1. A windscreen wiper device, comprising:
a longitudinally extending wiper element made of an elastomeric material;

a carrier element including at least one pre-curved longitudinal strip operably supporting said wiper element;
a connector device with a first piece and a second piece; and
a joint part which is connectable to said second piece of said connector device and is configured for attachment with an oscillating wiper arm;
said second piece including a pair of prongs which extend through aligned openings in said first piece and said at least one pre-curved longitudinal strip, a first portion of said prongs extending at an angle relative to a second portion of said prongs, wherein said second piece of said connector device has a pair of co-axially aligned protrusions that are received in co-axially aligned openings in said joint part to allow said joint part to pivot relative to said connector device;
said pair of prongs being plastically deformed to lock and fasten said first and second pieces of said connector device with said at least one pre-curved longitudinal strip.

2. The windscreen wiper device as set forth in claim 1, wherein said first piece of said connector device is made of plastic and wherein said second piece of said connector device is made of metal.

3. The windscreen wiper device as set forth in claim 1, wherein ends of said prongs are plastically deformed in laterally outward directions.

4. The windscreen wiper device as set forth in claim 1 wherein said second piece of said connector device includes a pair of generally J-shaped side walls that are spaced apart from one another in a lateral direction.

5. The windscreen wiper device as set forth in claim 4 wherein each of said J-shaped side walls has a lower edge that is received in a slot on said first piece of said connector device.

6. The windscreen wiper device as set forth in claim 1 wherein said first portion of said prongs extends substantially perpendicular to said second portion of said prongs.

7. The windscreen wiper device as set forth in claim 1 wherein said pair of prongs are substantially L-shaped.

8. The windscreen wiper device as set forth in claim 1 wherein ends of said prongs are plastically deformed in laterally inward directions.

9. A windscreen wiper device, comprising:
a longitudinally extending wiper element made of an elastomeric material;
a carrier element including at least one pre-curved longitudinal strip operably supporting said wiper element;
a connector device with a first piece and a second piece; and
a joint part which is connectable to said second piece of said connector device and is configured for attachment with an oscillating wiper arm;
said second piece including a pair of prongs which extend through aligned openings in said first piece and said at least one pre-curved longitudinal strip, a first portion of said prongs extending at an angle relative to a second portion of said prongs;
said pair of prongs being plastically deformed to lock and fasten said first and second pieces of said connector device with said at least one pre-curved longitudinal strip, wherein ends of said prongs are plastically deformed in laterally outward directions.

10. The windscreen wiper device as set forth in claim 9 wherein said first piece of said connector device is made of plastic and wherein said second piece of said connector device is made of metal.

11. The windscreen wiper device as set forth in claim 9 wherein said second piece of said connector device includes a pair of generally J-shaped side walls that are spaced apart from one another in a lateral direction.

12. The windscreen wiper device as set forth in claim 11 wherein each of said J-shaped side walls has a lower edge that is received in a slot on said first piece of said connector device.

13. The windscreen wiper device as set forth in claim 9 wherein said first portion of said prongs extends substantially perpendicular to said second portion of said prongs.

14. The windscreen wiper device as set forth in claim 9 wherein said pair of prongs are substantially L-shaped.

15. A windscreen wiper device, comprising:
a longitudinally extending wiper element made of an elastomeric material;
a carrier element including at least one pre-curved longitudinal strip operably supporting said wiper element;
a connector device with a first piece and a second piece; and
a joint part which is connectable to said second piece of said connector device and is configured for attachment with an oscillating wiper arm;
said second piece including a pair of prongs which extend through aligned openings in said first piece and said at least one pre-curved longitudinal strip, a first portion of said prongs extending at an angle relative to a second portion of said prongs;
said pair of prongs being plastically deformed to lock and fasten said first and second pieces of said connector device with said at least one pre-curved longitudinal strip, wherein ends of said prongs are plastically deformed in laterally inward directions.

16. The windscreen wiper device as set forth in claim 15 wherein said first piece of said connector device is made of plastic and wherein said second piece of said connector device is made of metal.

17. The windscreen wiper device as set forth in claim 15 wherein said second piece of said connector device includes a pair of generally J-shaped side walls that are spaced apart from one another in a lateral direction.

18. The windscreen wiper device as set forth in claim 17 wherein each of said J-shaped side walls has a lower edge that is received in a slot on said first piece of said connector device.

19. The windscreen wiper device as set forth in claim 15 wherein said first portion of said prongs extends substantially perpendicular to said second portion of said prongs.

20. The windscreen wiper device as set forth in claim 15 wherein said pair of prongs are substantially L-shaped.

* * * * *